(12) United States Patent
Yamamoto et al.

(10) Patent No.: US 11,852,228 B2
(45) Date of Patent: Dec. 26, 2023

(54) DIFFERENTIAL DEVICE

(71) Applicant: NSK LTD., Tokyo (JP)

(72) Inventors: Akihiro Yamamoto, Fujisawa (JP); Eiji Inoue, Fujisawa (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 18/027,276

(22) PCT Filed: Mar. 14, 2022

(86) PCT No.: PCT/JP2022/011343
§ 371 (c)(1),
(2) Date: Mar. 20, 2023

(87) PCT Pub. No.: WO2022/215449
PCT Pub. Date: Oct. 13, 2022

(65) Prior Publication Data
US 2023/0272846 A1    Aug. 31, 2023

(30) Foreign Application Priority Data

Apr. 5, 2021 (JP) .................................. 2021-064315

(51) Int. Cl.
*F16H 48/24* (2006.01)
*F16H 48/08* (2006.01)
*F16H 48/20* (2012.01)

(52) U.S. Cl.
CPC .............. *F16H 48/24* (2013.01); *F16H 48/08* (2013.01); *F16H 2048/202* (2013.01)

(58) Field of Classification Search
CPC ..... F16H 48/24; F16H 48/16; F16H 2048/202
See application file for complete search history.

(56) References Cited

U.S. PATENT DOCUMENTS

| 6,027,422 A * | 2/2000 | Yamazaki | B60K 23/04 |
| | | | 192/53.36 |
| 7,156,771 B2 * | 1/2007 | Teraoka | F16D 23/06 |
| | | | 477/181 |
| 7,654,934 B2 * | 2/2010 | Alfredson | F16H 48/295 |
| | | | 477/35 |

(Continued)

FOREIGN PATENT DOCUMENTS

| JP | 2001-287550 A | 10/2001 |
| JP | 2020-046065 A | 3/2020 |

OTHER PUBLICATIONS

International Search Report for PCT/JP2022/011343 dated May 24, 2022.
Written Opinion for PCT/JP2022/011343 dated May 24, 2022.

*Primary Examiner* — Timothy Hannon
*Assistant Examiner* — James J Taylor, II
(74) *Attorney, Agent, or Firm* — Sughrue Mion, PLLC

(57) ABSTRACT

A differential device includes: an input member; a case member arranged coaxially with the input member; a one-way clutch arranged between the input member and the case member and transmitting torque therebetween only when the input member attempts to rotate in a normal rotation direction; a pinion gear supported by the case member to rotate about the axis perpendicular to the center axis of the case member; and a pair of side gears supported coaxially with the input member to rotate relative to the input member and the case member and meshing with the pinion gear.

5 Claims, 7 Drawing Sheets

(56) References Cited

U.S. PATENT DOCUMENTS

| | | | |
|---|---|---|---|
| 7,990,004 B2 * | 8/2011 | Aikawa | B60K 6/52 |
| | | | 310/58 |
| 10,514,073 B2 * | 12/2019 | Lee | F16D 41/061 |
| 2002/0019284 A1 | 2/2002 | Aikawa et al. | |

* cited by examiner

FIG. 3(A)
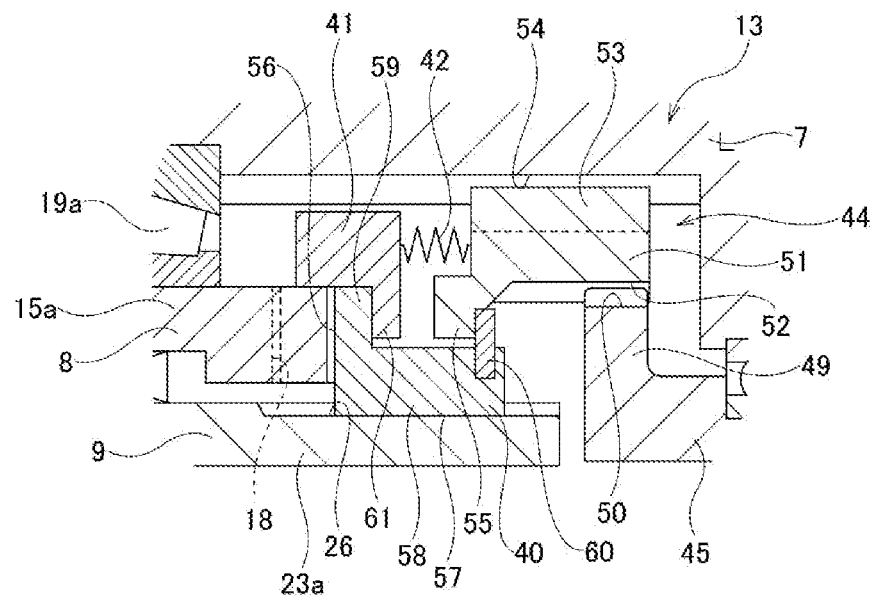
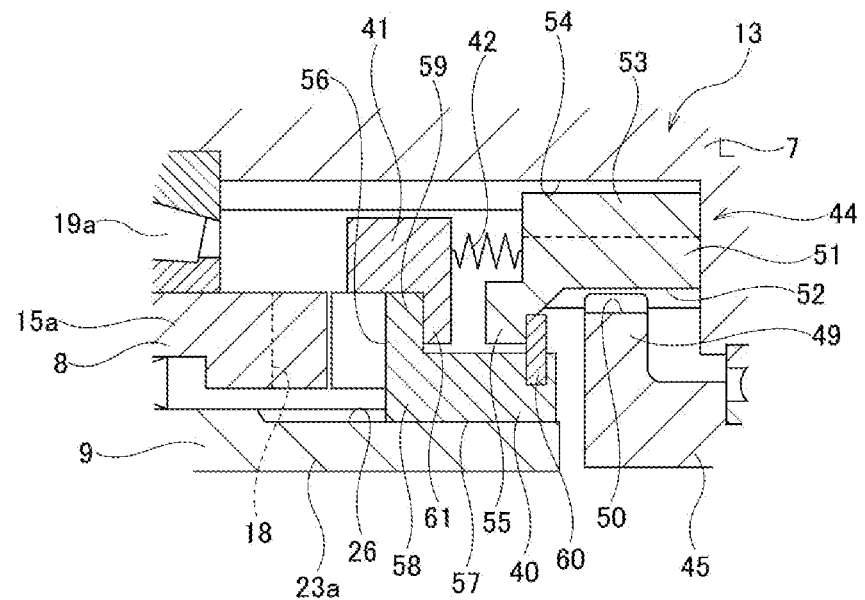
FIG. 3(B)

DIFFERENTIAL DEVICE

CROSS REFERENCE TO RELATED APPLICATIONS

This application is a National Stage of International Application No. PCT/JP2022/011343 filed Mar. 14, 2022, claiming priority based on Japanese Patent Application No. 2021-064315 filed Apr. 5, 2021.

TECHNICAL FIELD

The present invention relates to a differential device for distributing power from a drive source to a pair of drive wheels.

BACKGROUND ART

In a drive device for an automobile, the torque of a drive source such as an engine or a drive motor is transmitted to a differential device (differential gear) through a speed-reducing mechanism including a transmission or a power transmission mechanism such as a propeller shaft, and is distributed to a pair of drive wheels by the differential device.

The drive device for an automobile as described above has room for improvement in terms of improving fuel efficiency or power efficiency. That is, when the accelerator is turned off while a vehicle equipped with the drive device for an automobile is running, loss occurs at meshing portions of the speed-reducing mechanism, the drive source, etc., so the coasting distance may be shortened.

JP 2020-046065A describes a differential device including a clutch device between a differential case and a side gear. With such a differential device, the coasting distance can be increased by disengaging the clutch device so as to disconnect the drive wheels and the power transmission mechanism during coasting. As a result, the fuel efficiency or power efficiency of the vehicle can be improved.

CITATION LIST

Patent Literature

Patent Literature 1: JP 2020-046065A

SUMMARY OF THE INVENTION

Technical Problem

However, the differential device described in JP 2020-046065A has the following problems.

That is, the differential device described in JP 2020-046065A uses a dog clutch as the clutch device, which is connected by engaging concave-convex portions in which concave portions and convex portions are alternately arranged in the circumferential direction on a pair of axial side surfaces facing each other.

Therefore, when the clutch device is attempted to be connected in a state where the relative rotational speed between the differential case and the side gears is higher than a predetermined speed, the convex portions of one engaging concave-convex portion is repelled by the convex portions of the other engaging concave-convex portion so that their engagement with the concave portions of the other engaging concave-convex portion is inhibited.

On the other hand, in a state where the rotational speed of the differential case and the rotational speed of the side gears are completely matched, when the engaging concave-convex portions are brought close to each other in order to connect the clutch device, the tip end surface of the convex portions of one engaging concave-convex portion and the tip end surface of the convex portions of the other engaging concave-convex portion may come into contact with each other. In this case, the engaging concave-convex portions cannot be engaged so that the clutch device may not be connected.

Accordingly, in the differential device described in JP 2020-046065A, the clutch device is required to be connected in a state where the relative rotational speed between the differential case and the side gears is equal to or lower than a predetermined speed. That is, it is required to strictly adjust the timing of connecting the clutch device, and this may make the control troublesome.

An object of the present invention is to provide a differential device which can easily switch between enabling or disabling torque transmission between the drive wheels and the power transmission mechanism.

Solution to Problem

The differential device according to one aspect of the present invention includes an input member, a case member, a one-way clutch, at least one pinion gear, and a pair of side gears.

The input member has a torque input portion. The torque input portion may be configured by such as a ring gear that meshes with a gear, a pulley for mounting a belt, or a sprocket for mounting a chain.

The case member is arranged coaxially with the input member so as to rotate relative to the input member.

The one-way clutch is arranged between the input member and the case member and transmits torque between the input member and the case member only when the input member attempts to rotate relative to the case member in the normal rotation direction. Here, normal rotation direction refers to the rotation direction of the input member with respect to the case member when torque is transmitted from the drive source to the drive wheels in order to move the vehicle forward. Further, the one-way clutch may be configured by such as a roller clutch, a cam clutch, a sprag clutch, a ratchet clutch.

The pinion gear is supported by the case member so as to be able to rotate about an axis perpendicular to the center axis of the case member.

The pair of side gears is supported coaxially with the center axis of the input member so as to rotate relative to the input member and the case member, and mesh with the pinion gear.

The differential device according to one aspect of the present invention may further include a clutch device that is arranged between the input member and the case member and switches the connection/disconnection state (enabling or disabling torque transmission) between the input member and the case member. In this case, the clutch device has an actuator and switches the connection/disconnection state based on the operation of the actuator.

In the differential device according to one aspect of the present invention, the clutch device may have a first clutch member and a second clutch member. In this case, the first clutch member has a first engaging concave-convex portion formed by alternatively arranging concave portions and convex portions in the circumferential direction on a first side surface facing in the axial direction, and is supported by one of the input member and the case member so as to displace in the axial direction based on an operation of the actuator. Further, the second clutch member has a second engaging concave-convex portion formed by alternatively arranging concave portions and convex portions in the circumferential direction on a second side surface facing the first side surface in the axial direction, and is configured so as to be integral with the other member of the input member and the case member, or is supported by and fixed to the other member.

In the differential device according to one aspect of the present invention, the clutch device may include an electric motor having an output shaft and a linear motion mechanism that converts rotation of the output shaft into motion in the axial direction of the first clutch member. The linear motion mechanism may be configured by, for example, a slide screw type or ball type feed screw mechanism or a cam device.

In the differential device according to one aspect of the present invention, the one-way clutch may have an outer diameter side engaging surface provided directly or through the other member on the inner circumferential surface of the input member, an inner diameter side engaging surface provided directly or through the other member on the outer circumferential surface of the case member, and an engaging element arranged between the outer diameter side engaging surface and the inner diameter side engaging surface.

In the differential device according to one aspect of the present invention, the case member may be supported inside in the radial direction of the input member so as to rotate freely, and the input member may have an oil hole for supplying lubricant to the one-way clutch.

In the differential device according to one aspect of the present invention, an end portion of the oil hole that is closer to the one-way clutch may open radially inward from the inner diameter side engaging surface.

Effect of Invention

With the differential device according to one aspect of the present invention, it is possible to easily switch between enabling or disabling torque transmission between the drive wheels and the power transmission mechanism.

BRIEF DESCRIPTION OF DRAWINGS

FIG. 3 (A) is an enlarged view of portion X in FIG. 2 illustrating a state in which a clutch device is connected, and FIG. 3 (B) is an enlarged view of portion X in FIG. 2 illustrating a state in which the clutch device is disconnected.

DESCRIPTION OF THE EMBODIMENTS

First Example

Figure 1:
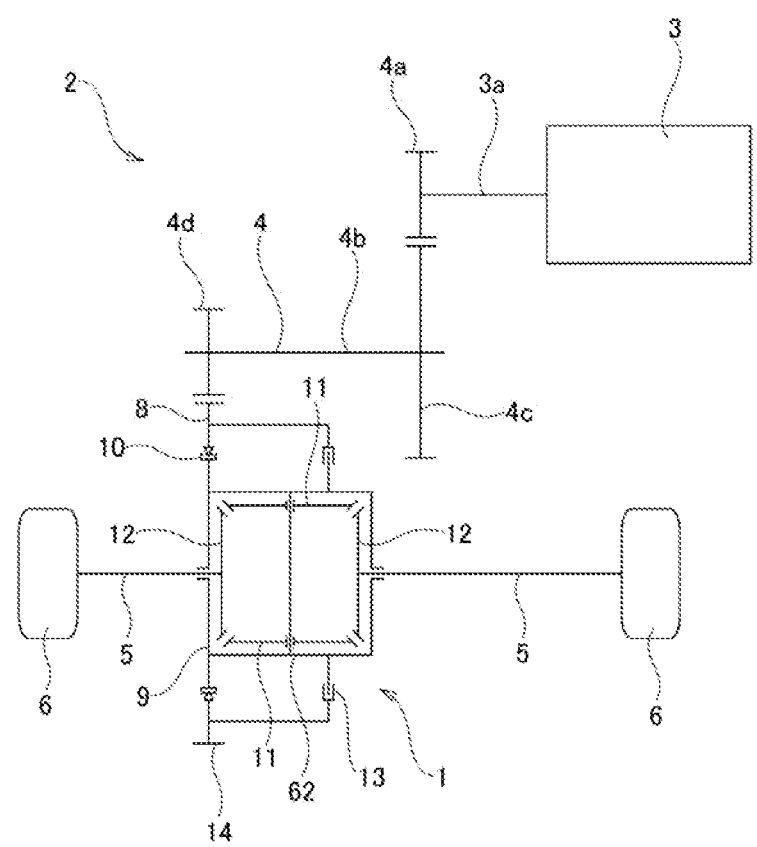
FIG. 1 is a schematic view of a drive device for an electric vehicle incorporating a differential device of a first example of an embodiment of the present invention.
Figure 2:
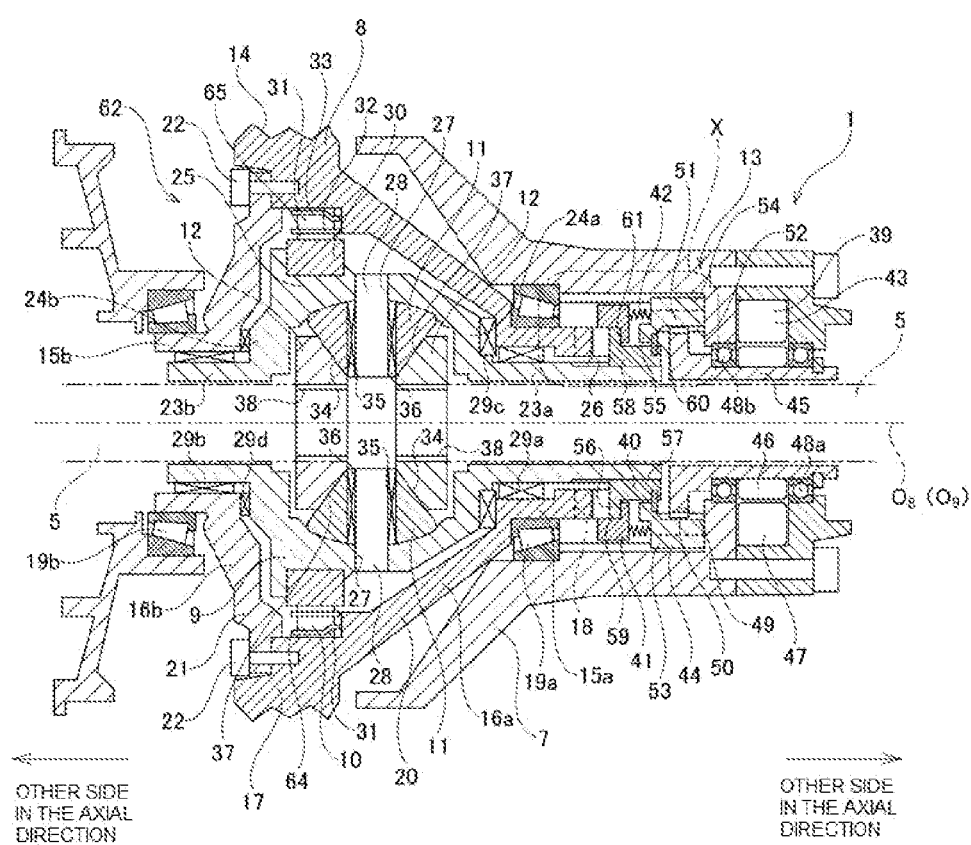
FIG. 2 is a cross-sectional view illustrating the differential device of the first example.
Figure 4:
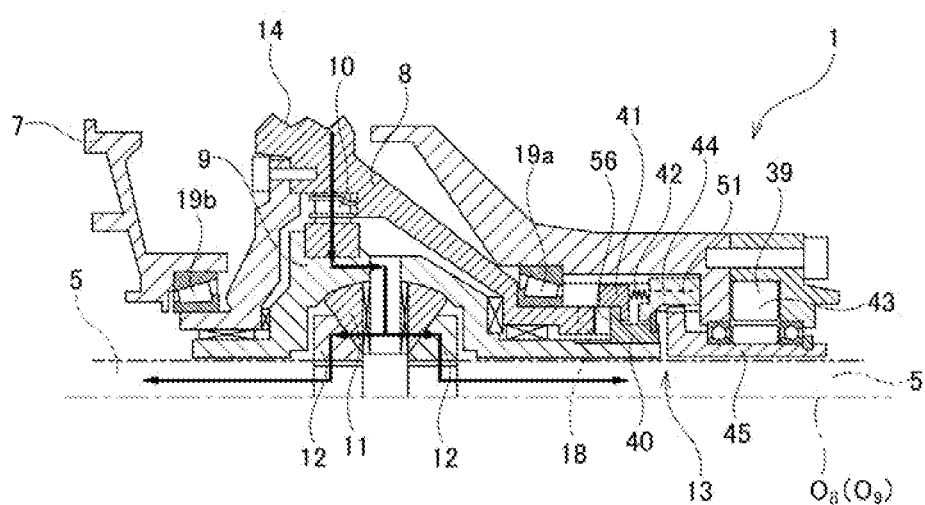
FIG. 4 is a view for illustrating a torque transmission path when the vehicle is not coasting in the forward direction.
Figure 5:
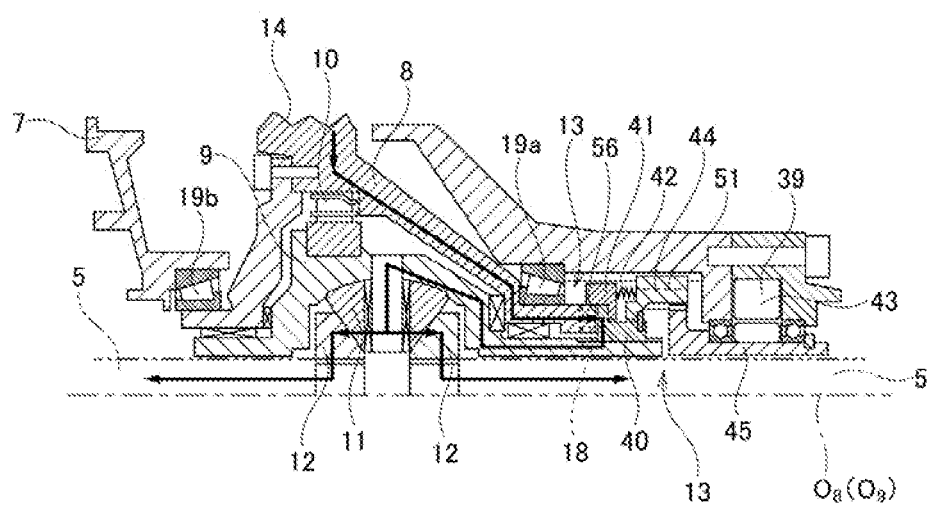
FIG. 5 is a view for illustrating the torque transmission path when the vehicle is running in the backward direction.

FIG. 1 to FIG. 5 illustrate a first example of an embodiment of the present invention. FIG. 1 illustrates a drive device 2 for an electric vehicle incorporating a differential device 1 of this example. The drive device 2 for an electric vehicle increases the output torque of a drive motor 3 by a power transmission mechanism 4, transmits it to the differential device 1, and distributes it to a pair of drive shafts 5. As a result, drive wheels 6 supported at the tip end portions of the pair of drive shafts 5 through suspensions (not illustrated) are rotationally driven.

In this example, the power transmission mechanism 4 is configured by a gear-type reducer. The power transmission mechanism 4 includes a drive gear 4a, an intermediate shaft 4b, an intermediate gear 4c, and a final gear 4d. The drive gear 4a is supported by and fixed to an output shaft 3a of the drive motor 3. The intermediate shaft 4b is supported so as to be parallel to the output shaft 3a of the drive motor 3 and so as to rotate with respect to the vehicle body (not illustrated). The intermediate gear 4c has more teeth than those of the drive gear 4a, and is supported by and fixed to the intermediate shaft 4b. The final gear 4d has less teeth than those of the intermediate gear 4c, and is supported by and fixed to the intermediate shaft 4b.

The power transmission mechanism 4 may also include a transmission such as an automatic transmission (AT), a belt-type or toroidal-type continuously variable transmission (CVT), an automated manual transmission (AMT), a dual clutch transmission (DCT), or a manual transmission (MT), and a propeller shaft. Further, the power transmission mechanism 4 may also be configured by, for example, a belt-type or chain-type power transmission mechanism and/or a friction roller reducer instead of or in addition to a gear-type reducer.

The differential device 1 of this example includes a housing 7, an input member 8, a case member 9, a one-way clutch 10, pinion gears 11, a pair of side gears 12, and a clutch device 13.

Regarding the differential device 1, the axial direction, the circumferential direction, and the radial direction mean, unless specified otherwise, the axial direction, the circumferential direction, and the radial direction of the input member 8. The axial direction, the circumferential direction, and the radial direction of the input member 8 coincide with the axial direction, the circumferential direction, and the radial direction of the case member 9, and the axial direction, the circumferential direction, and the radial direction of the pair of side gears 12. One side in the axial direction means the right side in FIG. 2 to FIG. 5, and the other side in the axial direction means the left side in FIG. 2 to FIG. 5.

The housing 7 is supported by and fixed to the vehicle body and does not rotate during use.

The input member 8 has a ring gear 14 forming a torque input portion. The ring gear 14 is provided on the outer circumferential surface of the input member 8, and engages with the final gear 4d of the power transmission mechanism 4. In this example, the input member 8 has a stepped cylindrcial shape, and includes a small-diameter cylindrical portion 15a, a connecting portion 16a, a large-diameter cylindrical portion 17, a connecting portion 16b, and a small-diameter cylindrical portion 15b.

The small-diameter cylindrical portion 15a on the one side in the axial direction has a cylindrical shape, and has an input-side engaging concave-convex portion 18 formed by alternatively arranging concave portions and convex portions in the circumferential direction on the end surface on the one side in the axial direction.

The connecting portion 16a on the one side in the axial direction has a substantially conical cylindrical shape inclined in a direction in which the inner diameter and the outer diameter increase from the one side toward the other side in the axial direction, and connects the end portion on the other side in the axial direction of the small-diameter cylindrical portion 15a on the one side in the axial direction and the end portion on the one side in the axial direction of the large-diameter cylindrical portion 17. That is, the end portion on the one side in the axial direction of the connecting portion 16a is connected to the end portion on the other side in the axial direction of the small-diameter cylindrical portion 15a, and the end portion on the other side in the axial direction of the connecting portion 16a is connected to the end portion on the one side in the axial direction of the large-diameter cylindrical portion 17.

The large-diameter cylindrical portion 17 has a cylindrical shape. A ring gear 14 is provided on the outer circumferential surface of the large-diameter cylindrical portion 17. In this example, the ring gear 14 is configured by a helical gear. The ring gear 14 may also be configured by a spur gear or a bevel gear. Alternatively, the torque input portion to which the torque from the power transmission mechanism 4 is input may also be configured by a pulley for mounting a belt or a sprocket for mounting a chain.

The connecting portion 16b on the other side in the axial direction has a substantially hollow circular plate shape, and connects the end portion on the other side in the axial direction of the large-diameter cylindrical portion 17 and the end portion on the one side in the axial direction of the small-diameter cylindrical portion 15b on the other side in the axial direction. That is, the end portion on the outside in the radial direction of the connecting portion 16b is connected to the end portion on the other side in the axial direction of the large-diameter cylindrical portion 17, and the end portion on the inside in the radial direction of the connecting portion 16b is connected to the end portion on the one side in the axial direction of the small-diameter cylindrical portion 15b.

The small-diameter cylindrical portion 15b on the other side in the axial direction has a cylindrical shape.

The input member 8 is supported by a pair of tapered roller bearings 19a, 19b provided with a face-to-face (DF) contact angle so as to rotate with respect to the housing 7. Specifically, the tapered roller bearing 19a on the one side in the axial direction is arranged between the outer circumferential surface of the small-diameter cylindrical portion 15a on the one side in the axial direction and the inner circumferential surface of the housing 7, and the tapered roller bearing 19b on the other side in the axial direction between the outer circumferential surface of the small-diameter cylindrical portion 15b on the other side in the axial direction and the inner circumferential surface of the housing 7 so that the input member 8 is supported inside the housing 7 so as to rotate.

In this example, the input member 8 is formed by connecting and fixing the first element 20, which has the small-diameter cylindrical portion 15a on the one side in the axial direction, the connecting portion 16a on the one side in the axial direction, and the large-diameter cylindrical portion 17, and the second element 21, which has the connecting portion 16b on the other side in the axial direction and the small-diameter cylindrical portion 15b on the other side in the axial direction, with bolts 22. That is, the bolts 22 inserted through the through holes provided at locations in the circumferential direction of the connecting portion 16b of the second element 21 are screwed into the screw holes that open to the other side surface in the axial direction of the large-diameter cylindrical portion 17 of the first element 20 so as to connect the first element 20 and the second element 21 to configure the input member 8.

The case member 9 is arranged coaxially with the input member 8 so as to rotate relative to the input member 8. That is, the center axis $O_8$ of the input member 8 and the center axis $O_9$ of the case member 9 coincide with each other. In this example, the case member 9 has a stepped cylindrical shape, and is supported inside in the radial direction of the input member 8 so as to rotate relative to the input member 8. The case member 9 includes, in order from the one side in the axial direction, a small-diameter cylindrical portion 23a, a connecting portion 24a, a large-diameter cylindrical portion 25 forming the case cylindrical portion, a connecting portion 24b, and a small-diameter cylindrical portion 23b.

The small-diameter cylindrical portion 23a on the one side in the axial direction has a cylindrical shape, and has a male spline portion 26 on the outer circumferential surface of the portion on the one side in the axial direction.

The connecting portion 24a on the one side in the axial direction has a substantially hollow circular plate shape, and connects the end portion on the other side in the axial direction of the small-diameter cylindrical portion 23a on the one side in the axial direction and the end portion on the one side in the axial direction of the large-diameter cylindrical portion 25. That is, the end portion on the inside in the radial direction of the connecting portion 24a is connected to the end portion on the other side in the axial direction of the small-diameter cylindrical portion 23a, and the end portion on the outside in the radial direction of the connecting portion 24a is connected to the end portion on the one side in the axial direction of the large-diameter cylindrical portion 25.

The large-diameter cylindrical portion 25 has a substantially cylindrical shape, and has a circular hole 27 that opens to the inner circumferential surface at least one location in the circumferential direction. In this example, circular holes 27 are provided at two locations on the opposite sides in the radial direction of the large-diameter cylindrical portion 25. A base end portion of the support shaft 28 for supporting the pinion gears 11 is fitted and fixed in each circular hole 27. The large-diameter cylindrical portion 25 has an opening window at least one location in the circumferential direction, for example, opining windows at two locations on the opposite sides in the radial direction. When assembling the differential device 1, the pinion gears 11 and the side gears 12 are arranged inside the large-diameter cylindrical portion 25 through the opening windows.

The connecting portion 24b on the other side in the axial direction has a substantially hollow circular plate shape, and connects the end portion on the other side in the axial direction of the large-diameter cylindrical portion 25 and the end portion on the one side in the axial direction of the small-diameter cylindrical portion 23b on the other side in the axial direction. That is, the end portion on the outside in the radial direction of the connecting portion 24b is connected to the end portion on the other side in the axial direction of the large-diameter cylindrical portion 25, and the end portion on the inside in the radial direction of the connecting portion 24b is connected to the end portion on the one side in the axial direction of the small-diameter cylindrical portion 23b.

The small-diameter cylindrical portion 23b on the other side in the axial direction has a cylindrical shape.

The case member 9 is rotatably supported inside in the radial direction of the input member 8 by rolling bearings 29a, 29b, 29c, 29d. The differential device 1 of this example includes four rolling bearings 29a, 29b, 29c, 29d that rotatably support the case member 9 with respect to the input member 8. Specifically, the rolling bearing 29a which is a radial needle bearing is arranged between the inner circumferential surface of the small-diameter cylindrical portion 15a of the input member 8 and the outer circumferential surface of the small-diameter cylindrical portion 23a of the case member 9, and the rolling bearing 29b which is a radial needle bearing is arranged between the inner circumferential surface of the small-diameter cylindrical portion 15b of the input member 8 and the outer circumferential surface of the small-diameter cylindrical portion 23b of the case member 9. Moreover, the rolling bearings 29c which is a thrust needle bearing is arranged between the side surface on the other side in the axial direction of the connecting portion 16a of the input member 8 and a side surface on the one side in the axial direction of the connecting portion 24a of the case member 9, and the rolling bearings 29d which is a thrust needle bearing is arranged between a side surface on the on e side in the axial direction of the connecting portion 16b of the input member 8 and the other side surface in the axial direction of the connecting portion 24b of the case member 9. As a result, the case member 9 is supported inside the input member 8 so as to be able to rotate.

The one-way clutch 10 is arranged between the input member 8 and the case member 9. The one-way clutch 10 transmits torque from the input member 8 to the case member 9 only when the input member 8 attempts to rotate relative to the case member 9 in the normal rotation direction.

Here, the normal rotation direction is the relative rotation direction of the input member 8 with respect to the case member 9 when torque is transmitted from the drive motor 3 to the drive wheels 6 so as to move the vehicle forward.

In this example, the one-way clutch 10 is arranged between the large-diameter cylindrical portion 17 of the input member 8 and the large-diameter cylindrical portion 25 of the case member 9. The one-way clutch 10 includes an inner race 30, sprags 31 each correspond into an engaging element, a cage 32, and an biasing spring 33.

The inner race 30 is externally fitted and fixed to the large-diameter cylindrical portion 25 of the case member 9.

The sprags 31 are arranged at locations in the circumferential direction of a cylindrical space between the outer diameter side engaging surface 64 provided on the inner circumferential surface of the large-diameter cylindrical portion 17 of the input member 8 and the inner diameter side engaging surface 65 provided on the outer circumferential surface of the inner race 30 in a state of being held by the cage 32.

The biasing spring 33 biases each sprags 31 in a direction in in which each sprag 31 meshes with the outer diameter side engaging surface 64 and the inner diameter side engaging surface 65.

In the one-way clutch 10, when the input member 8 attempts to rotate relative to the case member 9 in the normal rotation direction, each sprag 31 swings in a predetermined direction so as to mesh with the outer diameter side engaging surface 64 and the inner diameter side engaging surface 65. As a result, the one-way clutch 10 is switched to the locked state, and torque transmission from the input member 8 to the case member 9 becomes possible. That is, the case member 9 rotates integrally with the input member 8.

On the other hand, when the input member 8 attempts to rotate relative to the case member 9 in the reverse direction, the sprags 31 swing in the direction opposite to the predetermined direction, and the one-way clutch 10 switches to an overrun state in which the sprags 31 are disengaged from the outer diameter side engaging surface 64 and the inner diameter side engaging surface 65. As a result, torque transmission between the input member 8 and the case member 9 becomes impossible. That is, either the input member 8 idles with respect to the case member 9 or the case member 9 idles with respect to the input member 8.

The pinion gears 11 are supported by the case member 9 so as to rotate about an axis perpendicular to the center axis $O_9$ of the case member 9. In this example, two pinion gears 11 are provided, and each pinion gear 11 is configured by a bevel gear. That is, the pinion gears 11 have a substantially truncated cone shape and has teeth 34 on the outer circumferential surface. Further, each pinion gear 11 has a center hole 35 which penetrates in the axial direction of the pinion gear 11 at the center. The pinion gears 11 are supported around the tip end portions of the support shaft 28 that is fitted and fixed to the large-diameter cylindrical portion 25 of the case member 9 through a radial needle bearing 36 so as to rotate.

The pair of side gears 12 are supported coaxially with the center axis $O_8$ of the input member 8 so as to rotate relative to the input member 8 and the case member 9, and mesh with the pinion gears 11. Each side gear of the pair of side gears 12 is configured by a bevel gear. That is, each side gear 12 has a substantially truncated cone shape, and has teeth 37 meshing with the teeth 34 of the pinion gears 11 on the outer circumferential surface. Further, each side gear 12 has a spline hole 38 which penetrates the center in the axial direction. The side gears 12 are arranged inside the large-diameter cylindrical portion 25 of the case member 9, and are connected and fixed to the base end portions of the drive shafts 5 so as to transmit torque thereto. That is, the spline shaft portions provided at the base end portions of the drive shafts 5 are spline-engaged with the spline holes 38 of the pair of side gears.

The clutch device 13 is arranged between the input member 8 and the case member 9. The clutch device 13 has an actuator 39, and the connection/disconnection state is switched based on the operation of the actuator 39. In this example, the clutch device 13 includes an actuator 39, a sleeve 40, a pressing member 41, and an elastic member 42.

The actuator 39 includes an electric motor 43 and a feed screw mechanism 44 which corresponds to a linear motion mechanism.

The electric motor 43 has an output shaft 45, a rotor 46, and a stator 47.

The output shaft 45 has a hollow cylindrical shape, and is supported by a pair of rolling bearings 48a, 48b so as to be coaxial with the center axis $O_8$ of the input member 8 and so as to rotate with respect to the housing 7. The drive shaft 5 on one side in the axial direction is inserted through the inside in the radial direction of the output shaft 45. In other words, the output shaft 45 is supported around the drive shaft 5 on the one side in the axial direction so as to be coaxial with this drive shafts 5 and so as to rotate relative to this drive shaft 5. Moreover, the output shaft 45 has an outward flange portion 49 protruding toward outside in the radial direction at the end portion on the other side in the axial direction, and has a male screw portion on the outer circumferential surface of the outward flange portion 49.

The rotor 46 is externally fitted and fixed around the intermediate portion in the axial direction of the output shaft 45 so as to rotate integrally with the output shaft 45.

The stator 47 is arranged around the rotor 46 so as to be coaxially with the rotor 46, and is supported inside the housing 7.

The feed screw mechanism 44 is configured by screwing a female screw portion 52 provided on the inner circumferential surface of the nut 51 into the male screw portion 50 of the output shaft 45. The nut 51 is supported so as to be able to displace only in the axial direction with respect to the housing 7 by spline-engaging the male spline portion 53 provided on the outer circumferential surface with the female spline portion 54 provided on the inner circumferential surface of the housing 7. That is, when the electric motor 43 is energized and the output shaft 45 is rotationally driven, the rotation of the output shaft 45 is converted into motion in the axial direction of the nut 51 based on screwing of the male screw portion 50 of the output shaft 45 and the female screw portion 52 of the nut 51.

Moreover, the nut 51 has an inward flange portion 55 protruding toward inside in the radial direction at the end portion on the other side in the axial direction.

The sleeve 40 has a case-side engaging concave-convex portion 56, in which concave portions and convex portions are alternately arranged in the circumferential direction, on the end surface on the other side in the axial direction, and is supported so as to displace in the axial direction with respect to the case member 9.

In this example, the sleeve 40 includes a cylindrical portion 58 having a female spline portion 57 on the inner circumferential surface, an outward flange portion 59 protruding from the end portion on the other side in the axial direction of the cylindrical portion 58 toward outside in the radial direction, and a retaining ring 60 that is locked on the outer circumferential surface of the end portion on the one side in the axial direction of the cylindrical portion 58. The case-side engaging concave-convex portion 56 is provided at the radially outer portion of the end surface on the other side in the axial direction of the cylindrical portion 58 and on the side surface on the other side in the axial direction of the outward flange portion 59.

The sleeve 40 is supported so as to displace only in the axial direction with respect to the case member 9 by spline-engaging the female spline portion 57 provided on the inner circumferential surface of the cylindrical portion 58 with the male spline portion 26 provided on the outer circumferential surface of the small-diameter cylindrical portion 23a of the case member 9.

The radially outer portion of the side surface on the other side in the axial direction of the retaining ring 60 abuts against the side surface on the one side in the axial direction of the inward flange portion 55 of the nut 51.

The pressing member 41 has the inward flange portion 61 protruding toward inside in the radial direction at the end portion on the one side in the axial direction, and the side surface on the other side in the axial direction of the inward flange portion 61 abuts against the side surface on the one side in the axial direction of the outward flange portion 59 of the sleeve 40.

The elastic member 42 is held between the nut 51 and the pressing member 41 in an elastically compressed state. The elastic member 42 may be configured by, for example, a torsion coil spring, a leaf spring, or the like.

The clutch device 13 switches between a state in which torque is transmitted between the input member 8 and the case member 9 and a state in which torque is not transmitted therebetween based on the energization of the electric motor 43 of the actuator 39.

That is, when the nut 51 is displaced toward the other side in the axial direction by rotationally driving the output shaft 45 in a predetermined direction based on the energization of the electric motor 43, the sleeve 40 is pressed toward the other side in the axial direction through the elastic member 42 and the pressing member 41. As a result, as illustrated in FIG. 3 (A), the case-side engaging concave-convex portion 56 provided on the sleeve 40 and the input-side engaging concave-convex portion 18 provided on the input member 8 are engaged, and the clutch device 13 is connected. As a result, torque transmission between the input member 8 and the case member 9 becomes possible.

That is, in this example, the sleeve 40 forms a first clutch member, the end surface on the other side in the axial direction of the sleeve 40 forms a first side surface, and the case-side engaging concave-convex portion 56 provided on the sleeve 40 forms a first engaging concave-convex portion. Moreover, the input member 8 forms a second clutch member, the end surface on one side in the axial direction of the small-diameter cylindrical portion 15a provided on the input member 8 forms a second side surface, and the input-side engaging concave-convex portion 18 provided on the input member 8 forms a second engaging concave-convex portion. However, in a case of implementing the present invention, it is also possible to support the first clutch member so as to displace in the axial direction with respect to the input member based on the operation of the actuator, and the second clutch member may be configured integrally with the case member or may be supported by and fixed to the case member.

In this example, since the elastic member 42 elastically biases the pressing member 41 toward the other side in the axial direction, the case-side engaging concave-convex portion 56 and the input-side engaging concave-convex portion 18 can be reliably engaged. That is, when the sleeve 40 is pressed toward the other side in the axial direction based on the energization of the electric motor 43 in order to connect the clutch device 13, the tip end surfaces of the convex portions of the case-side engaging concave-convex portion 56 and the tip end surfaces of the convex portions of the input-side engaging concave-convex portion 18 may come into contact with each other. From this state, when the sleeve 40 is further pressed toward the other side in the axial direction, the elastic member 42 is elastically compressed between the nut 51 and the pressing member 41. Due to this, when the input member 8 and the case member 9 rotate slightly relative to each other and the convex portions of the case-side engaging concave-convex portion 56 and the convex portions of the input-side engaging concave-convex portion 18 are out of phase in the circumferential direction, the elastic member 42 is elastically restored, and the pressing member 41 is pressed toward the other side in the axial direction. As a result, the convex portions of the case-side engaging concave-convex portion 56 and the convex portions of the input-side engaging concave-convex portion 18 are alternately arranged in the circumferential direction so that the case-side engaging concave-convex portion 56 and the input-side engaging concave-convex portion 18 are engaged.

On the other hand, when the output shaft 45 is rotationally driven in the direction opposite to the predetermined direction based on the energization of the electric motor 43 so as to displace the nut 51 toward the one side in the axial direction, the retaining ring 60 is pulled toward the one side in the axial direction by the inward flange portion 55 of the nut 51, and the sleeve 40 is displaced toward the one side in the axial direction. As a result, as illustrated in FIG. 3 (B), the engagement between the case-side engaging concave-convex portion 56 and the input-side engaging concave-convex portion 18 is disengaged, and the clutch device 13 is disconnected. That is, torque transmission between the input member 8 and the case member 9 becomes impossible.

In the differential device 1 of this example, the power transmission path is switched by switching the connection/disconnection state of the clutch device 13 based on the energization of the electric motor 43 and by switching the connection/disconnection state of the one-way clutch 10 based on the direction of the relative rotation between the input member 8 and the case member 9.

<When Non-Coasting the Vehicle in the Forward Direction>

In a state where the shift lever is switched to a forward driving range such as D range or L range in order to move the vehicle forward, the clutch device 13 is disconnected based on the energization of the electric motor 43. In this state, when the drive motor 3 outputs torque in the direction of moving the vehicle forward based on the operation of the accelerator by the driver, etc., this torque is transmitted to the pair of drive shafts 5 through the path illustrated in FIG. 4.

The torque output from the drive motor 3 is increased by the power transmission mechanism 4 and then transmitted to the input member 8. As a result, when the input member 8 attempts to rotate relative to the case member 9 in the normal rotation direction, the one-way clutch 10 is switched to the locked state, and the input member 8 and the case member 9 rotate integrally.

When the case member 9 rotates, the two pinion gears 11 rotate about the center axis $O_9$ of the case member 9, that is, revolve. Further, the pair of side gears 12 rotates about their own center axis arranged coaxially with the center axis $O_8$ of the input member 8 based on the meshing of the teeth 34 of the pinion gears 11 and the teeth 37 of the side gears 12. As a result, the pair of drive shafts 5 connected and fixed to the pair of side gears 12 are rotationally driven, and a pair of drive wheels 6 are rotationally driven in the direction of moving the vehicle forward.

<When Coasting the Vehicle in the Forward Direction>

In a state that the vehicle is running at high speed with the shift lever switched to the forward driving range and the clutch device 13 disengaged, when the accelerator is turned off in order to perform inertia travel called coasting travel or sailing travel and torque input from the drive motor 3 to the input member 8 ceases, the rotational speed of the input member 8 in the normal rotation direction decreases, and becomes slower than the rotational speed of the case member 9 in the normal rotation direction. That is, the input member 8 rotates in the reverse direction relative to the case member 9. As a result, the one-way clutch 10 is switched to the overrun state, and the case member 9 can idle with respect to the input member 8. In short, the pair of drive wheels 6 are disconnected from the power transmission mechanism 4 and the drive motor 3 so as to coast.

<When Driving the Vehicle Backward>

In a state that the shift lever is switched to the R range, that is, the reverse driving range, in order to move the vehicle backward, the clutch device 13 is connected based on the energization of the electric motor 43 so that the input member 8 and the case member 9 can rotate integrally. In this state, when torque is output from the drive motor 3 in the direction of driving the vehicle backward based on the operation of the accelerator by the driver, etc., this torque is transmitted to the pair of drive shafts 5 through the path illustrated in FIG. 5.

The torque output from the drive motor 3 is increased by the power transmission mechanism 4 and then transmitted to the input member 8. Rotation of the input member 8 is transmitted to the case member 9 through the clutch device 13. That is, the rotation is transmitted to the sleeve 40 through the engaging portion between the input-side engaging concave-convex portion 18 and the case-side engaging concave-convex portion 56, and then further transmitted to the case member 9 through the area of spline engagement between the female spline portion 57 of the sleeve 40 and the male spline portion 26 of the case member 9. As a result, the input member 8 and the case member 9 rotate integrally.

When the case member 9 rotates, the two pinion gears 11 rotate about the center axis $O_9$ of the case member 9, and the pair of side gears 12 rotate about their own center axis arranged coaxially with the center axis $O_8$ of the input member 8 based on the meshing of the teeth 34 of the pinion gears 11 and the teeth 37 of the side gears 12. As a result, the pair of drive shafts 5 connected and fixed to the pair of side gears 12 are rotationally driven, and the pair of drive wheels 6 are rotationally driven in the direction of driving the vehicle backward.

In any running state, the difference in rotational speed between the pair of drive wheels 6 that occurs during cornering or the like is absorbed by the two pinion gears 11 rotating (revolving) around the support shaft 28.

As described above, with the differential device 1 of this example, the pair of drive wheels 6 can be disconnected from the power transmission mechanism 4 and the drive motor 3 during coasting in the forward direction. As a result, the coasting distance can be extended. In other words, the speed reduction during coasting can be moderated. As a result, power efficiency of the electric vehicle equipped with the differential device 1 can be improved.

Particularly in this example, the one-way clutch 10 is arranged between the input member 8 having the ring gear 14 to which torque is input from the final gear 4d and the case member 9 supporting the pinion gears 11. In other words, the input member 8 having the ring gear 14 and the case member 9 supporting the pinion gears 11 are combined through the one-way clutch 10 so as to configure the differential case 62.

In the differential device 1 of this example, the connection/disconnection state of the one-way clutch 10 is switched based on the direction of the relative rotation between the input member 8 and the case member 9 when the vehicle is running forward.

Specifically, when the drive motor 3 outputs torque in the direction of moving the vehicle forward based on the operation of the accelerator by the driver, etc., and the input member 8 attempts to rotate relative to the case member 9 in the normal rotation direction, the one-way clutch 10 is switched to the locked state and the torque from the drive motor 3 is transmitted to the pair of drive wheels 6 through the power transmission mechanism 4 and the differential device 1. On the other hand, when the accelerator is turned off and torque input from the drive motor 3 to the input member 8 ceases, and the input member 8 rotates relative to the case member 9 in the reverse direction, the one-way clutch 10 is switched to the overrun state and torque from the pair of drive wheels 6 is no longer transmitted to the power transmission mechanism 4 and the drive motor 3.

As described above, in the differential device 1 of this example, the direction of the relative rotation of the input member 8 with respect to the case member 9 is switched according to changes in the input torque from the drive motor 3. Then, the connection/disconnection state of the one-way clutch 10 is switched according to a change in the direction of the relative rotation of the input member 8 with respect to the case member 9, thereby enabling or disabling torque transmission between the pair of drive wheels 6 and the power transmission mechanism 4 and the drive motor 3 is switched. Therefore, unlike the differential device described in JP 2020-046065A, there is no need to strictly adjust the timing of connecting the clutch device. In short, it is possible to easily switch enabling or disabling torque transmission between the pair of drive wheels 6 and the power transmission mechanism 4 and the drive motor 3.

Moreover, the differential device 1 of this example has the clutch device 13 arranged between the input member 8 and the case member 9. The connection/disconnection state of the clutch device 13 is switched based on the operation of the actuator 39, specifically in this example, the energization of the electric motor 43. That is, by connecting the clutch device 13, torque can be transmitted between the pair of drive wheels 6 and the power transmission mechanism 4 and the drive motor 3 regardless of the direction of the relative rotation of the input member 8 with respect to the case member 9. Therefore, by connecting the clutch device 13, the torque output from the drive motor 3 in the direction of driving the vehicle backward and transmitted to the input member 8 through the power transmission mechanism 4 can be transmitted to the pair of drive wheels 6 through the differential device 1.

In the electric vehicle equipped with the differential device 1 of this example, the clutch device 13 is basically disconnected when the shift lever is switched to the forward driving range. However, when decelerating the vehicle while the vehicle is running forward, the torque from the case member 9 can be transmitted to the input member 8 by connecting the clutch device 13. The torque transmitted to the input member 8 is transmitted to the output shaft 3a of the drive motor 3 through the power transmission mechanism 4. Then, when the output shaft 3a rotates, the drive motor 3 functions as a generator and regenerative braking is performed.

In this example, the outer diameter side engaging surface 64 that engages with the sprags 31 is directly provided on the inner circumferential surface of the large-diameter cylindrical portion 17 of the input member 8, in a case of implementing the present invention, the outer diameter side engaging surface may be provided on the inner circumferential surface of the input member through the other member. And/or, although the inner diameter side engaging surface 65 that engages with the sprags 31 are provided on the outer circumferential surface of the large-diameter cylindrical portion 25 of the case member 9 through the inner race 30, in a case of implementing the present invention, the inner diameter side engaging surface may be provided on the outer circumferential surface of the case member through the other member.

Moreover, in this example, although the one-way clutch 10 is configured by a sprag clutch having a plurality of sprags 31, in a case of implementing the present invention, the one-way clutch can also be configured by a roller clutch, a ratchet type clutch, or the like.

In this example, the linear motion mechanism for converting the rotation of the output shaft 45 of the electric motor 43 into motion in the axial direction is configured by the sliding type feed screw mechanism 44. However, in a case of implementing the present invention, the linear motion mechanism can also be configured by a ball screw type feed screw mechanism, a cam device, or the like. Moreover, in this example, the actuator 39 for switching the connection/disconnection state of the clutch device 13 is configured by an electric actuator having the electric motor 43. However, in a case of implementing the present invention, the actuator can also be configured by a hydraulic actuator or the like.

Further, the differential device of the present invention can be applied not only to a drive device for an electric vehicle (EV) using a drive motor as a drive source, but also to a drive device for a fossil fuel vehicle using an engine as a drive source, a drive device for a hybrid vehicle (HV) using a drive motor and an engine as drive sources, and the like.

Second Example

Figure 6:
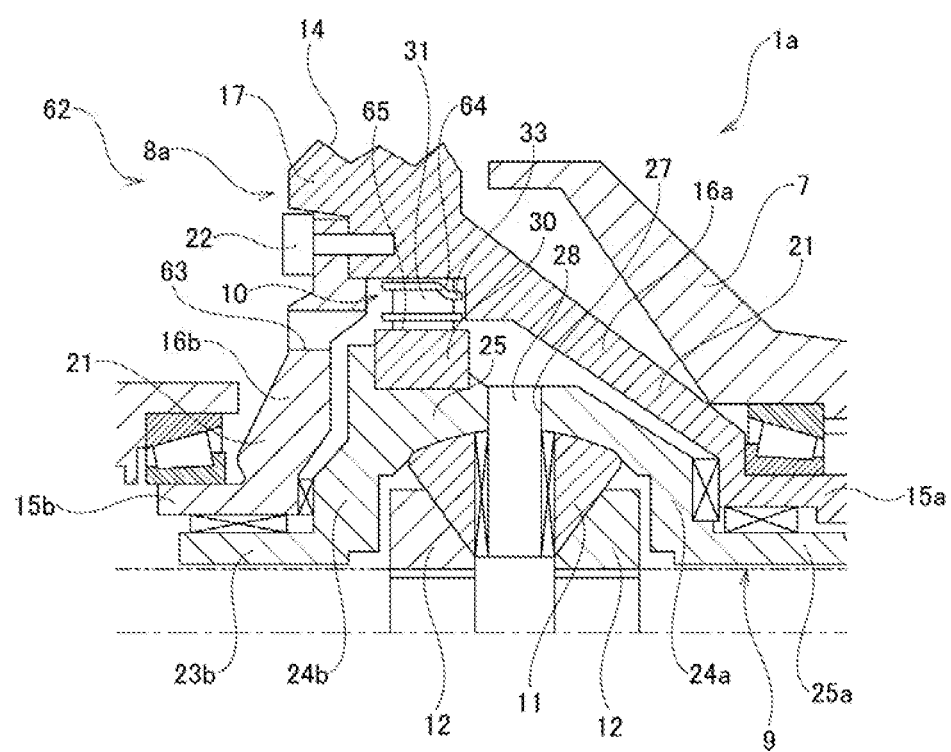
FIG. 6 is an enlarged cross-sectional view of major parts of a drive device for an electric vehicle incorporating a differential device of a second example of an embodiment of the present invention.
Figure 7:
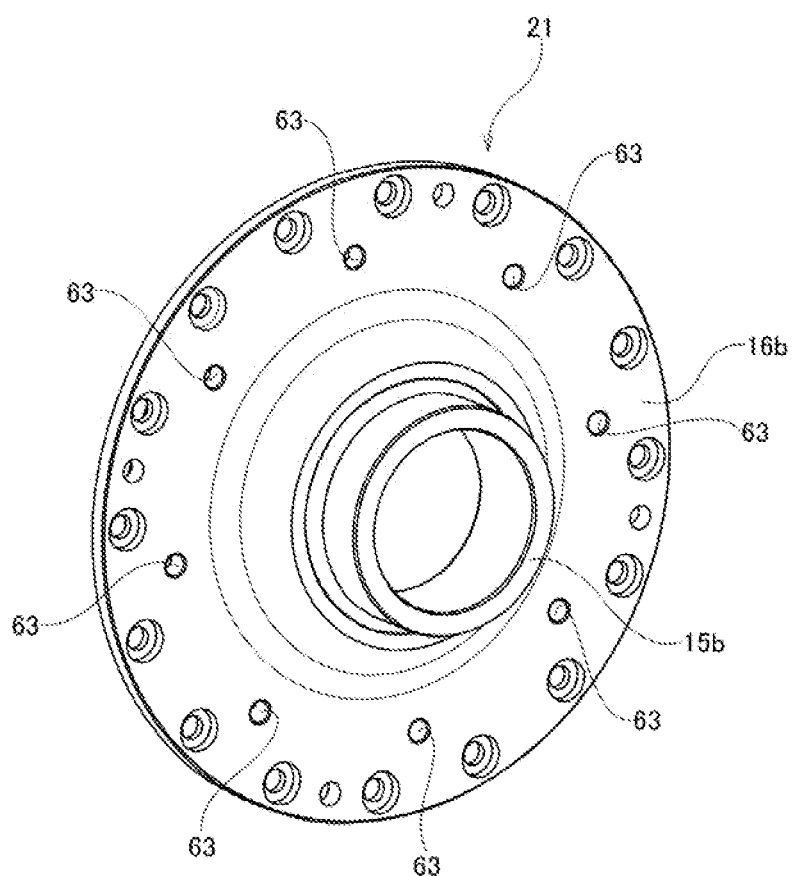
FIG. 7 is a perspective view of the second example, illustrating a second element.

FIG. 6 and FIG. 7 illustrate the second example of an embodiment of the present invention. In the differential device 1a of this example, an oil hole 63 for supplying lubricant to the one-way clutch 10 is provided in the input member 8a. The oil hole 63 is provided so as to axially penetrate one or more locations in the circumferential direction of the connecting portion 16b on the other side in the axial direction corresponding to the side plate portion. In this example, the oil holes 63 are provided at eight locations evenly spaced in the circumferential direction of the connecting portion 16b.

The end portions of the oil holes 63 on the side closer to the one-way clutch 10, that is, the end portions on the other side in the axial direction open radially inward from the inner diameter side engaging surface 65 provided on the outer circumferential surface of the large-diameter cylindrical portion 25 of the case member 9. However, the entire openings on the other side in the axial direction of the oil holes 63 need not be located radially inward of the inner diameter side engaging surface 65, at least part of the openings on the other side in the axial direction of the oil holes 63, that is, the end portions on the inside in the radial direction of the openings on the other side in the axial direction, may be located radially inward of the inner diameter side engaging surface 65.

With the differential device 1a of this example, a sufficient amount of lubricating oil can be supplied to the one-way clutch 10 arranged between the large-diameter cylindrical portion 17 of the input member 8a and the large-diameter cylindrical portion 25 of the case member 9 through the oil holes 63. As a result, the lubricating state of the one-way clutch 10 can be favorably maintained for a long period of time, and the durability of the differential device 1a can be sufficiently ensured.

Further, in this example, since the end portions on the other side in the axial direction of the oil holes 63 are opened radially inward of the inner diameter side engaging surface 65, lubricant can be reliably supplied to the contact portions between the inner diameter side engaging surface 65 and the sprags 31 each corresponding to an engaging element. The configuration and operational effects of the other parts are the same as those of the first example.

REFERENCE SIGNS LIST 1, 1a Differential device
2 Drive device for an electric vehicle
3 Drive motor
3a Output shaft 4 Power transmission mechanism
4a Drive gear
4b Intermediate shaft
4c Intermediate gear
4d Final gear
5 Drive shafts
6 Drive wheels
7 Housing
8, 8a Input member
9 Case member
10 One way clutch
11 Pinion gears
12 Side gears
13 Clutch device
14 Ring gear
15a, 15b Small-diameter cylindrical portion
16a, 16b Connecting portion
17 Large-diameter cylindrical portion
18 Input-side engaging concave-convex portion
19a, 19b Tapered roller bearings
20 First element
21 Second element
22 Bolt
23a, 23b Small-diameter cylindrical portion
24a, 24b Connecting portion
25 Large-diameter cylindrical portion
26 Male spline portion
27 Circular hole
28 Support shaft
29a, 29b, 29c, 29d Rolling bearings
30 Inner race
31 Sprag
32 Cage
33 Biasing spring
34 Teeth
35 Center hole
36 Radial needle bearing
37 Teeth
38 Spline hole
39 Actuator
40 Sleeve
41 Pressing member
42 Elastic member
43 Electric motor
44 Feed screw mechanism
45 Output shaft
46 Rotor
47 Stator
48a, 48b Rolling bearings
49 Outward flange portion
50 Male screw portion
51 Nut
52 Female screw portion
53 Male spline portion
54 Female spline portion
55 Inward flange portion
56 Case-side engaging concave-convex portion
57 Female spline portion
58 Cylindrical portion
59 Outward flange portion
60 Retaining ring
61 Inward flange portion
62 Differential case
63 Oil hole
64 Outer diameter side engaging surface
65 Inner diameter side engaging surface

The invention claimed is:

1. A differential device comprising:
an input member having a torque input portion;
a case member arranged coaxially with the input member so as to rotate relative to the input member;
a one-way clutch arranged between the input member and the case member and transmitting torque between the input member and the case member only when the input member attempts to rotate relative to the case member in a normal rotation direction;
at least one pinion gear supported by the case member so as to rotate about an axis perpendicular to a center axis of the case member;
a pair of side gears supported coaxially with the center axis of the input member so as to rotate relative to the input member and the case member and meshing with the pinion gear; and
a clutch device arranged between the input member and the case member and switching a connection/disconnection state between the input member and the case member;
the clutch device having an actuator, a first clutch member, a second clutch member, and an elastic member,
the first clutch member having a first engaging concave-convex portion formed by alternatively arranging concave portions and convex portions in a circumferential direction on a first side surface facing in an axial direction, the first clutch member supported by one of the input member and the case member so as to displace in the axial direction based on an operation of the actuator,
the second clutch member having a second engaging concave-convex portion formed by alternatively arranging concave portions and convex portions in the circumferential direction on a second side surface facing the first side surface in the axial direction, the second clutch member configured so as to be integral with the other member of the input member and the case member, or supported by and fixed to the other member,
the elastic member held between the actuator and the first clutch member in an elastically compressed state, and elastically biasing the first clutch member in the axial direction toward the second clutch member, and
the clutch device being able to be connected by pressing the first clutch member in the axial direction toward the second clutch member through the elastic member by the actuator, and being able to be disconnected by displacing the first clutch member in the axial direction away from the second clutch member by the actuator.

2. The differential device according to claim 1, wherein the actuator includes an electric motor having an output shaft and a linear motion mechanism converting rotation of the output shaft into motion in the axial direction of the first clutch member.

3. The differential device according to claim 1, wherein the one-way clutch has an outer diameter side engaging surface provided directly or through another member on an inner circumferential surface of the input member, an inner diameter side engaging surface provided directly or through another member on an outer circumferential surface of the case member, and an engaging element arranged between the outer diameter side engaging surface and the inner diameter side engaging surface.

4. The differential device according to claim 1, wherein the case member is supported inside in a radial direction of the input member so as to rotate freely, and the input member has an oil hole for supplying lubricant to the one-way clutch.

5. The differential device according to claim 4, wherein an end portion of the oil hole that is closer to the one-way clutch opens radially inward from an inner diameter side engaging surface.

\* \* \* \* \*